June 2, 1964  T. GIZESKI  3,135,493
ELECTRO-PNEUMATIC VALVE OPERATOR
Filed June 20, 1962  2 Sheets-Sheet 1
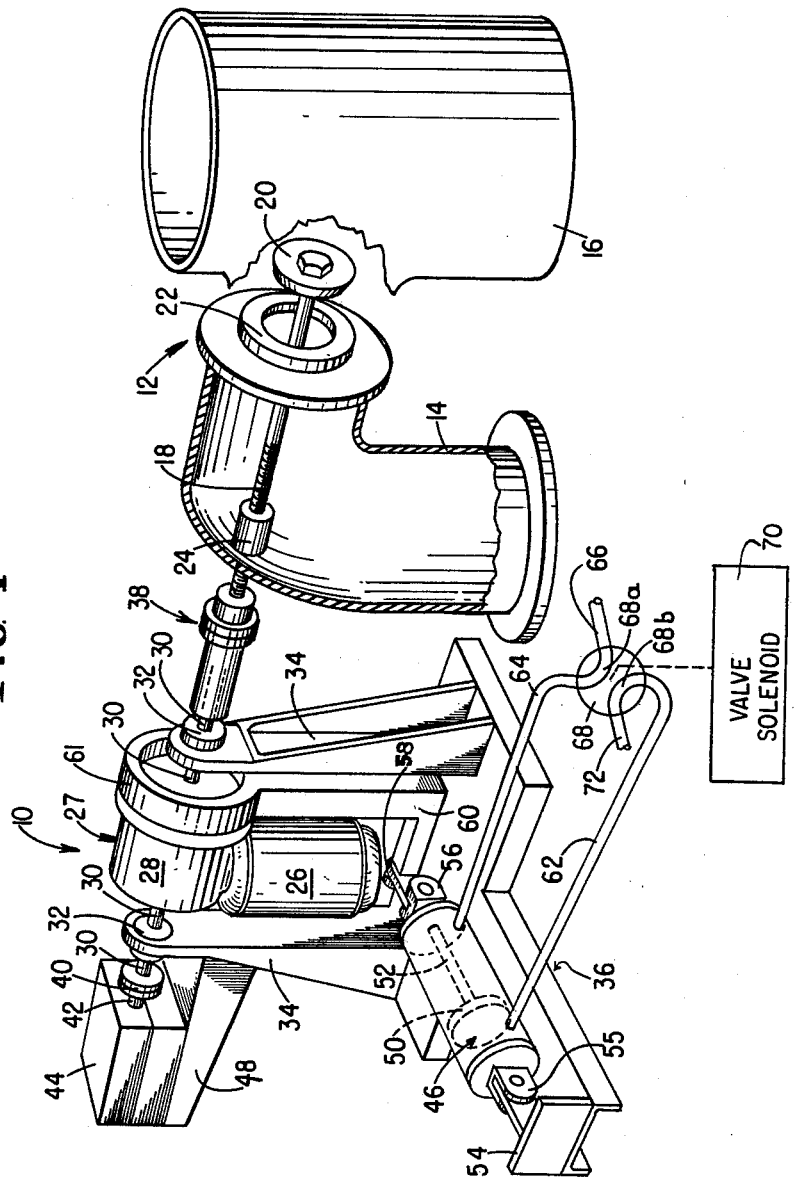
INVENTOR.
Terrence Gizeski
BY
Byron Hume, Green & Clement
Attys.

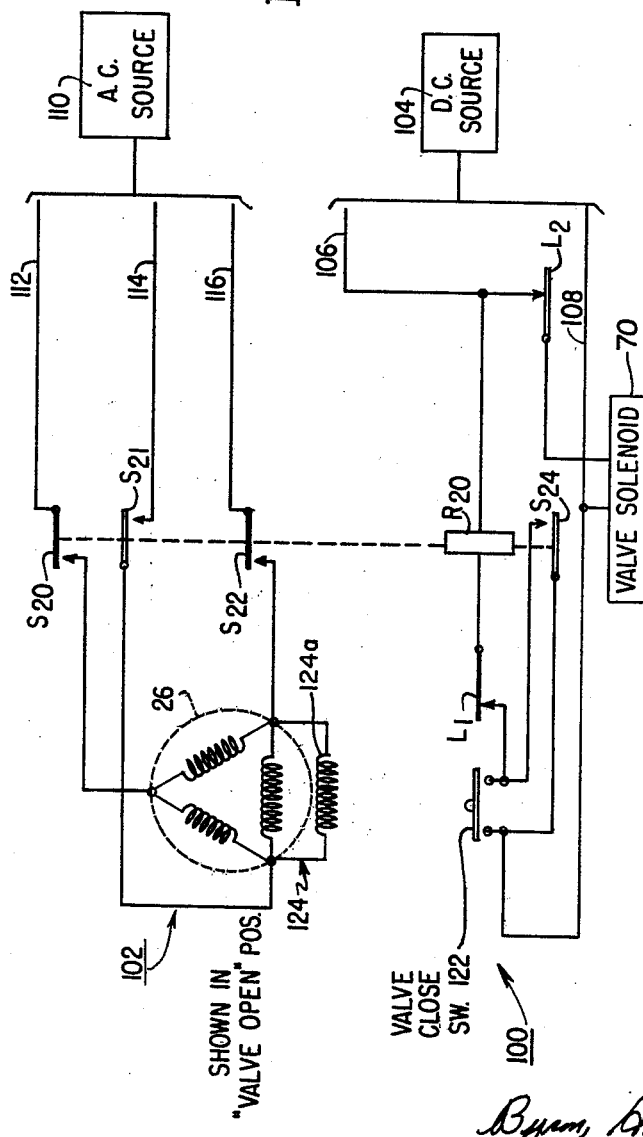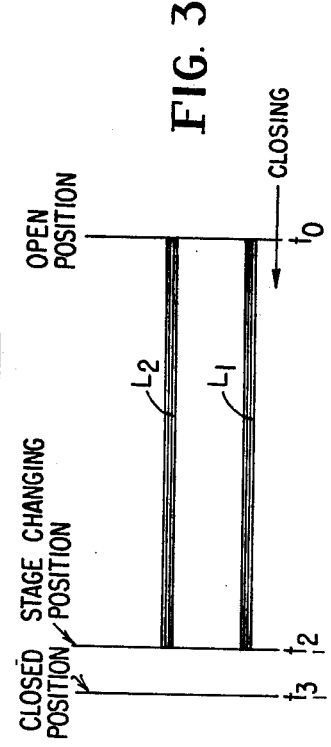

United States Patent Office

3,135,493
Patented June 2, 1964

3,135,493
ELECTRO-PNEUMATIC VALVE OPERATOR
Terrence Gizeski, Chicago, Ill., assignor to Ferguson, Hille & Associates, Inc., Chicago, Ill., a corporation of Illinois
Filed June 20, 1962, Ser. No. 203,900
9 Claims. (Cl. 251—30)

This invention relates to an apparatus for operating a valve and, more particularly, to an electro-pneumatic valve operator.

Large multi-turn stem type valves are in common usage, particularly in the piping systems of automatic stove changers, hydraulically driven power stations and oil refineries. Customarily such valves are operated manually or with operator controlled gear motors. Manual operation does not permit automatic or remote control and gear motor control is inadequate to meet the varied torque and travel requirements for opening and closing of the valve. Specifically, if the motor operates on the basis of effecting a predetermined number of revolutions to close the valve, after minimal usage of the valve the motor will fail to close the valve because of inherent wear between the valve disc and valve seat.

It is therefore an object of the present invention to provide an apparatus for opening and closing a stem type valve which alleviates these disadvantages.

It is a further object of the present invention to provide an apparatus for opening and closing a stem type valve which will provide a positive tight shut-off of the valve.

It is still a further object of the present invention to provide an apparatus for opening and closing a stem type valve which will provide a positive tight shut-off for the valve and positively hold the valve in this shut-off position.

It is still a further object of the present invention to provide an electro-pneumatic valve operator which will effect the above-mentioned objects.

It is still a further object of the present invention to provide such an electro-pneumatic valve operator which is easily installed upon existing stem type valves.

These and other objects more apparent hereinafter are accomplished by the electro-pneumatic valve operator of the present invention which includes a gear motor and pneumatic reaction cylinder which cooperatively close a multi-turn stem type valve. The gear motor and pneumatic reaction cylinder cooperate whereby the major portion of the closing cycle is effected by the gear motor. This will hereinafter be referred to as the "initial closing stage." The pneumatic reaction cylinder effects the positive shut-off of the valve, hereinafter called the "final closing stage," and holds the valve disc against the valve seat by pneumatic force.

As will be more apparent hereinafter, the valve operator of the present invention may be used in a variety of ways to open the valve.

The invention, both as to its organization and method of operation, taken with further objects and advantages thereof, will best be understood by reference to the following description taken in connection with the accompanying drawings, in which:

FIGURE 1 is a perspective view of the electro-pneumatic valve operator of the present invention, including a schematic diagram of the pneumatic system associated with said valve operator;

FIGURE 2 is a schematic diagram of the electrical circuit of the electro-pneumatic valve operator illustrated in FIGURE 1; and FIGURE 3 is a graphical representation of the time during the closing cycle that switches in a limit switch arrangement of the valve operator are open or closed.

Referring to the drawings, and more particularly to FIGURE 1, the electro-pneumatic valve operator of the present invention is indicated generally by reference numeral 10. As shown in FIGURE 1, the valve operator 10 is to effect the opening and closing of a valve 12 in a branch pipe 14 from a main pipe 16. To these ends the valve operator 10 is connected to a valve stem 18 of the valve 12. A valve disc 20 attached to a free end of the valve stem 18 cooperates with a valve seat 22 to allow or prevent flow through the pipe 14 to or from the pipe 16. A collar 24 is secured to the pipe 14, the valve stem 18 threadably engaging the collar 24 whereby rotation of the stem 18 moves the valve disc 20 toward or away from the valve seat 22 to open or close the valve 12.

The electro-pneumatic valve operator 10 includes a gear motor indicated generally by reference numeral 27 which comprises a three-phase alternating current motor 26, a gear box 28, and a rotatable drive shaft 30 extending from both ends of the gear box 28. The gear motor 27 is also equipped with a braking means, indicated generally by reference numeral 124 in FIGURE 2, which will lock the gear motor 27 and shaft 30. The braking means 124 is actuated by a coil 124a (FIGURE 2). The gear box 28 and alternating current motor 26 cooperate to drive the shaft 30. The gear motor 27 is suspendedly supported by the shaft 30 which extends through self-alignment bearings 32 mounted in vertical support columns 34 of a frame 36. A coupling 38 fixedly secures the valve stem 18 to the drive shaft 30 whereby rotation of the drive shaft 30 will rotate the valve stem 18 in the same direction the same number of revolutions. It will be understood that the shaft 30 does not move axially.

Attached to the other end of the drive shaft 30 by a coupling 40 is a switch actuator 42 of a limit switch assembly 44 which, in a manner more apparent hereinafter, controls the operation of the gear motor 27 and a pneumatic reaction cylinder 46. The limit switch assembly 44 is mounted on a platform 48 secured by suitable means to the vertical support column 34.

The pneumatic reaction cylinder 46 has a reciprocal piston 50 therein connected to a piston shaft 52 which extends outwardly of one end of the cylinder 46. The shaft 52 has a yoke 56 attached thereto which is pivotally attached to a link 58 fixedly secured to a reaction arm 60. The other end of the reaction cylinder 46 has a yoke 55 attached thereto which is pivotally secured to a support member 54 on the frame 36. In this manner as the piston 50 and shaft 52 move the cylinder 46 will pivot about the pivotal attachment between the yoke 55 and the support member 54.

The reaction arm 60 has a hub 61 which is secured to the gear box 28 of the gear motor 27. The reaction arm 60 is rotatable about the axis of the shaft 30 and upon rotation will rotate the entire gear motor 27 by virtue of the attachment between the hub 61 and the gear box 28.

If the braking means 124 (FIGURE 2) in the motor 27 is on then the shaft 30 will rotate with the gear motor 27 and the reaction arm 60.

Rotation of the reaction arm 60 is effected by the reaction cylinder 46 and the movement of the piston 50 therein. To these ends pressurized fluid, such as air, oil or the like, is selectively supplied to the reaction cylinder 46 through a supply line 66. A valve 68, controlled by a valve solenoid 70, controls the flow of fluid from the line 66 to lines 62 or 64 which communicate with opposite ends of the cylinder 46. The valve 68, which is illustrated schematically in FIGURE 1, has passageways 68a and 68b therein. In the position illustrated in FIGURE 1, the valve 68 allows fluid from the line 66 to pass through the passageway 68a to the line 64, the valve solenoid 70 being energized at this time. This causes the piston 50 and the shaft 52 to move toward the left when viewing FIGURE 1 and holds the piston 50 at the left end of the cylinder 46 as illustrated in FIGURE 1. Fluid displaced from the cylinder 46 when the piston 50 moves to the left exits therefrom through the line 62 and passes through the passageway 68b in the valve 68 to a discharge pipe 72. During such movement of the piston 50 and the shaft 52 the reaction arm 60 will be rotated in a clockwise direction, thereby rotating the gear motor 27 in a clockwise direction also. In this instance, for purposes of illustration, clockwise rotation of the shaft 30 and the valve stem 18 causes the valve 12 to open and vice versa.

If the rotational movement of the reaction arm 60 is to be reversed the valve solenoid 70 is de-energized whereby the valve 68 is rotated so that lines 66 and 62 communicate through passageway 68a and lines 64 and 72 communicate through passageway 68b. In this manner fluid passes from the line 66 to the line 62 into the reaction cylinder 46 and causes the piston 50 and shaft 52 to move toward the right when viewing FIGURE 1 and holds the piston 50 at the right end of the cylinder 46. Fluid displaced from the right end of the reaction cylinder 46 exits therefrom via line 64 and passes through the passageway 68b to the discharge line 72.

When the piston 50 and shaft 52 move toward the right they rotate the reaction arm 60 and gear motor 27 in a counterclockwise direction. As will be more apparent hereinafter this counterclockwise rotation of the reaction arm 60 occurs when the braking means 124 has locked the gear motor 27 to the shaft 30 and thus the shaft 30 will also rotate in a counterclockwise direction.

In accordance with the present invention, the valve operator 10 closes the valve 12 in two stages, the initial closing stage and final closing stage. The valve 12 is shown in FIGURE 1 in its fully open position. To close the valve 12 the gear motor 27 is turned on by actuation of the electric motor 26. In this manner through the gear box 28, the electric motor 26 drives the shaft 30 and the valve stem 18 in a counterclockwise direction causing the valve disc 20 to move toward the valve seat 22. This begins the initial closing stage. Assuming, for instance, that it takes 18 revolutions of the valve stem 18 for the valve disc 20 to seat on the valve seat 22, the gear motor 27 will continue to operate until approximately 17¾ revolutions of the drive shaft 30 and the valve stem 18 have been achieved. At this juncture the initial closing stage ends and the motor 26 shuts off by virtue of the cooperative action of the shaft 30 with the switch actuator 42 of the limit switch assembly 44. The braking means 124 locks the gear motor 27 to the shaft 30.

Simultaneously, the limit switch assembly 44 de-energizes the valve solenoid 70 whereby the valve 68 is rotated in the manner described hereinbefore and fluid from the line 66 drives the piston 50 to the right to move the reaction arm 60 in a counterclockwise direction. Rotation of the reaction arm 60 of course rotates the gear motor 27 and the shaft 30, since the gear motor 27 is now locked to the shaft 30. When the reaction arm 60 and therefore the shaft 30 have been rotated through approximately ¼ of a revolution, or enough to seat the valve disc 20 on the valve seat 22, movement of the reaction arm terminates. This completes the final closing stage. In this manner the reaction arm 60 assures that the valve 12 closes regardless of wear upon the valve disc 20 or the valve seat 22. While the valve disc 20 is seated on the valve seat 22 it will be positively held in this shut-off position by virtue of the pneumatic pressure on the piston 50 in the reaction cylinder 46.

It will be understood by one with ordinary skill in the art that the valve 12 may be opened, for example, by clockwise movement of the reaction arm 60 if the gear motor 27 is locked by suitable means to the shaft 30 or by energizing the electric motor 26 of the gear motor 27 to cause clockwise rotation of the shaft 30 if the gear motor 27 has sufficient torque.

Referring to FIGURE 2, there is shown a schematic diagram of the electrical control system for the electro-pneumatic valve operator 10. The control system comprises a valve solenoid circuit 100 and a motor circuit 102, the former being connected to a source of direct current 104 through conductors 106 and 108 and the latter being connected to a source of three phase alternating current 110 by conductors 112, 114 and 116. The motor circuit 102 includes the motor 26, relay contacts $S_{20}$, $S_{21}$ and $S_{22}$, and the coil 124a of the braking means 124. The solenoid circuit 100 includes relay $R_{20}$, relay contact $S_{24}$, the valve solenoid 70, limit switches $L_1$ and $L_2$ (which are in the limit switch assembly 44 shown in FIGURE 1), and push button switch 122, hereinafter referred to as the "valve close switch." The relay $R_{20}$ operates the contacts $S_{20}$, $S_{21}$, $S_{22}$, $S_{23}$ and $S_{24}$. When the relay $R_{20}$ is de-energized contacts $S_{20}$, $S_{21}$, $S_{22}$ and $S_{24}$ are open and vice versa.

FIGURE 3 illustrates the periods during the operational cycle when the limit switches $L_1$ and $L_2$ are open and closed. The two bars represent the period in which the particular limit switch is closed by virtue of the cooperation between the switch actuator 42 and the drive shaft 30. The control system is illustrated in FIGURE 2 when the valve 12 is fully open and as shown in FIGURES 2 and 3 the limit switches $L_1$ and $L_2$ are closed at this time in the cycle identified as time $t_0$. With the limit switches $L_1$ and $L_2$ closed the valve solenoid 70 is energized by a completed circuit through conductors 106 and 108, limit switch $L_2$ and the valve solenoid 70.

If it is desired to close the valve 12, the valve close switch 122 is momentarily depressed to complete a circuit through the conductors 106 and 108, the relay $R_{20}$, the limit switch $L_1$, and the valve close switch 122. In the meantime, the valve solenoid 70 remains energized in the manner described above. Energizing the relay $R_{20}$ causes contacts $S_{20}$, $S_{21}$, $S_{22}$, and $S_{24}$ to close. This completes a holding circuit through the conductors 106 and 108, the relay $R_{20}$, the limit switch $L_1$ and the contacts $S_{24}$. In this manner the close valve switch 122 need be depressed only momentarily to begin the initial closing cycle. It will be understood that the valve close switch 122 may be a button-type switch which are well known in the art.

Since the relay $R_{20}$ closes the contacts $S_{20}$, $S_{21}$ and $S_{22}$ a circuit is completed through these contacts and conductors 112, 114 and 116 whereby the motor 26 and the coil 124a of the braking means 124 are energized at the time $t_0$ to start the initial closing stage of the cycle. This causes the braking means 124 to release and the motor 26 to rotate in one direction whereby the gear motor 27 drives the gear shaft 30 and the valve stem 18 in a counterclockwise direction. This moves the valve disc 20 toward the valve seat 22, and is the initial closing stage.

After the valve stem 18 and the drive shaft 30 have rotated about 17¾ revolutions and the valve disc 20 is close to the valve seat 22 the valve operator has reached the "stage changing position" at the time $t_2$ shown in FIGURE 3. This is the point in the closing cycle when the initial closing stage terminates and the final closing stage begins. As a result of the cooperation between the shaft 30 and the switch actuator 42, the latter at this point causes the limit switches $L_1$ and $L_2$ to open as seen in FIGURE 3. This de-energizes the solenoid circuit 100 and the relay $R_{20}$ whereby the contacts $S_{20}$, $S_{21}$, $S_{22}$ and $S_{24}$ open. In this manner the motor circuit 102, and the coil 124a therein, is de-energized whereby the motor 26 no longer operates and the braking means 124 is applied to lock the gear motor 27 and shaft 30.

When the valve solenoid 70 is de-energized the valve 68 is rotated whereby fluid flows through the line 66, passageway 68a and the line 62 into the reaction cylinder 46 to cause the piston 50 and shaft 52 to move toward the right when viewing FIGURE 1. As a result thereof, in the manner described hereinbefore, the reaction arm 60 will rotate in a counterclockwise direction and cause the gear motor 27 and shaft 30 to do likewise. In this manner, the last approximately ¼ of a turn necessary to seat the valve disc 20 upon the valve seat 22 is effected by the reaction cylinder 46 and the reaction arm 60.

Rotation of the reaction arm 60 terminates at a time $t_3$ when the valve disc 20 engages the valve seat 22 sufficiently to resist the pressure of the fluid entering the reaction cylinder via line 62. The valve disc 20 is maintained in this closed position by virtue of the pressure being applied to the reaction arm 60 through the reaction cylinder 46. Therefore the valve disc 20 is pneumatically held in its closed position on the valve seat 22 and a force greater than the pneumatic pressure in the line 66 would be required to unseat the valve disc 20.

As mentioned hereinbefore the valve 12 may be opened by the reaction arm 60 or the gear motor 27 of the electro-pneumatic valve operator 10. The selection of a suitable electrical control system for opening the valve 12 with the electro-pneumatic valve operator 10 would be a matter of choice within the ordinary skill of one in the art.

It will be understood that the limit switch assembly 44 does not per se constitute a part of the present invention, such limit switch assemblies being well known to one skilled in the art. Furthermore, valves, such as the valve 68, having solenoid controls are well known in the art and do not constitute per se a part of the present invention.

While the embodiment described herein is at present considered to be preferred, it will be understood that various modifications and improvements may be made therein and it is intended to cover in the appended claims all such modifications and improvements as may fall within the true spirit and scope of the invention.

What is desired to be claimed and secured by Letters Patent of the United States is:

1. A valve operator for a valve having a rotatable valve stem which comprises motor means to rotate said stem, pneumatic actuated means attached to said motor means to rotate said motor means, and means for locking said motor to said stem so that upon rotation of said motor by said pneumatic actuated means said stem is also rotated.

2. A valve operator for a valve having a rotatable valve stem with a valve disc thereon, which comprises a motor having a drive shaft connected to said valve stem for rotating said valve stem, said motor having means to lock said motor to said drive shaft, and a pneumatic actuated reaction arm attached to said motor whereby upon pneumatically actuating said arm said motor is rotated about said drive shaft to rotate said valve stem.

3. The valve operator of claim 2 wherein said pneumatic actuated reaction arm comprises a pneumatic cylinder having a piston therein, the movement of said piston in said cylinder causing movement of said reaction arm and being controlled by supplying pressurized fluid to said cylinder.

4. A valve operator for a valve having a rotatable valve stem with a valve disc thereon, which comprises a motor having a drive shaft connected to said valve stem for rotating said valve stem, said motor having means to lock said motor to said drive shaft, and a pneumatic actuated reaction arm attached to said motor whereby upon pneumatically actuating said arm said motor is rotated about said drive shaft to rotate said valve stem, said pneumatic reaction arm including a pneumatic cylinder having a piston therein, the movement of said piston in said cylinder causing movement of said reaction arm, and being controlled by supplying pressurized fluid to said cylinder, said drive shaft being connected to a limit switch assembly, said limit switch assembly cooperating with an electrical control system to control the operation of the motor and pneumatic cylinder.

5. A valve operator to close a valve having a valve stem with a valve disc thereon, said valve stem being rotatable to close said valve, which comprises a motor having a drive shaft, means to support said drive shaft whereby said motor is free to rotate about said drive shaft, said drive shaft connected to said valve stem, a pneumatic reaction cylinder having a piston therein, means to connect said piston to said motor whereby movement of said piston within said cylinder will rotate said motor about an axis of said drive shaft, said motor including means to lock said motor to said drive shaft, and means to supply pressurized fluid to said reaction cylinder to cause movement of said piston within said reaction cylinder.

6. A valve operator to close a valve having a valve stem with a valve disc thereon, said valve stem being rotatable to close said valve, which comprises a motor having a drive shaft, means to support said drive shaft whereby said motor is free to rotate about said drive shaft, said drive shaft having one end connected to said valve stem and another end connected to a limit switch assembly, a pneumatic reaction cylinder having a piston therein, means to connect said piston to said motor whereby movement of said piston within said cylinder will rotate said motor about an axis of said drive shaft, said motor including a braking means to lock said motor to said drive shaft, means to supply pressurized fluid to said reaction cylinder to cause said piston to rotate said motor in the desired direction, and electrical control means cooperating with said limit switch assembly for actuating said motor, braking means and means to supply pressurized fluid.

7. A valve operator to close a valve having a valve stem with a valve disc thereon, said valve stem being rotatable to close said valve, which comprises a gear motor having a drive shaft, means to support said drive shaft whereby said motor is free to rotate about said drive shaft, said drive shaft having one end connected to said valve stem and another end connected to a limit switch assembly, a reaction arm attached to said motor, said reaction arm being actuated by a pneumatic reaction cylinder whereby said reaction arm will rotate said motor about an axis of said drive shaft, said motor including a braking means to lock said motor to said drive shaft, means to supply pressurized fluid to said reaction cylinder to cause said reaction cylinder to move said reaction arm and rotate said gear motor in the desired direction, and electrical control means associated with said limit switch assembly for actuating said motor, braking means and reaction cylinder.

8. A valve operator to close a valve having a valve stem with a valve disc thereon, said valve stem being rotatable to close said valve, which comprises a gear motor having an electric motor and a drive shaft, means to support said drive shaft whereby said gear motor is free to rotate about said drive shaft, said drive shaft having one end connected to said valve stem and another end connected to a limit switch assembly, a reaction arm attached to said gear motor, said reaction arm being actuated by a pneumatic reaction cylinder whereby said reaction arm will rotate said gear motor about an axis of said drive shaft, said gear motor including a braking means to lock said gear motor to said drive shaft, means to supply pressurized fluid to said reaction cylinder to cause said reaction cylinder to move said reaction arm and rotate said gear motor in the desired direction, electrical control means associated with said limit switch assembly for actuating said electric motor, braking means and reaction cylinder whereby said reaction cylinder and reaction arm cause said gear motor and said drive shaft to rotate when said gear motor and shaft are locked during the final closing stage thereby seating said valve disc on a valve seat to close said valve.

9. The valve operator of claim 8 wherein said valve disc is held on said valve seat when said valve is closed by said pressurized fluid acting within said reaction cylinder.

References Cited in the file of this patent

FOREIGN PATENTS 596,588   Germany _____ May 5, 1934

UNITED STATES PATENT OFFICE
CERTIFICATE OF CORRECTION

Patent No. 3,135,493                              June 2, 1964

Terrence Gizeski

It is hereby certified that error appears in the above numbered patent requiring correction and that the said Letters Patent should read as corrected below.

In the grant (only), line 1, for "Terence Gizeski" read -- Terrence Gizeski --; column 2, line 31, after "shaft 30." insert the following:

> The brake means 124 is of the type employed on the "Unibrake Motor" manufactured and sold by the Master Electric Company and described and illustrated in their Consolidated Price List (Data 53, dated June, 1955) entitled "Unibrake Motors". This type of brake means is further illustrated, with a parts list, in Master Electric Company's File Parts Catalogue, "Parts List for Single Disc Unibrake-Open Ventilated Type", pages 1-3 dated January 2, 1957.

Signed and sealed this 12th day of January 1965.

(SEAL)
Attest:

ERNEST W. SWIDER                              EDWARD J. BRENNER
Attesting Officer                              Commissioner of Patents